United States Patent [19]
Pidwerbetsky et al.

[11] Patent Number: 6,046,683
[45] Date of Patent: Apr. 4, 2000

[54] MODULATED BACKSCATTER LOCATION SYSTEM

[75] Inventors: Alex Pidwerbetsky, Randolph; R. Anthony Shober, Red Bank, both of N.J.

[73] Assignee: Lucent Technologies Inc., Murray Hill, N.J.

[21] Appl. No.: 08/777,643

[22] Filed: Dec. 31, 1996

[51] Int. Cl.⁷ .................. H04B 1/40; H04B 1/59
[52] U.S. Cl. .................. 340/825.54; 340/825.49; 340/505; 340/572; 342/42; 342/44; 342/51
[58] Field of Search .............. 340/825.54, 825.49, 340/505, 572, 573, 928, 935; 342/42, 56, 450, 454, 443, 44, 51; 235/384

[56] References Cited

U.S. PATENT DOCUMENTS

| | | |
|---|---|---|
| 3,720,940 | 3/1973 | Fox et al. . |
| 3,938,052 | 2/1976 | Glasson et al. . |
| 3,944,928 | 3/1976 | Augenblick et al. . |
| 3,984,835 | 10/1976 | Kaplan et al. . |
| 3,997,847 | 12/1976 | Tong . |
| 4,068,232 | 1/1978 | Meyers et al. . |
| 4,075,632 | 2/1978 | Baldwin et al. . |
| 4,360,810 | 11/1982 | Landt . |
| 4,471,345 | 9/1984 | Barrett, Jr. . |
| 4,510,495 | 4/1985 | Sigrimis et al. . |
| 4,584,534 | 4/1986 | Lijphart et al. . |
| 4,641,374 | 2/1987 | Oyama . |
| 4,656,463 | 4/1987 | Anders et al. . |
| 4,691,202 | 9/1987 | Denne et al. . |
| 4,737,789 | 4/1988 | Nysen ......................... 936/892 |
| 4,739,328 | 4/1988 | Koelle et al. . |
| 4,816,839 | 3/1989 | Landt . |

(List continued on next page.)

FOREIGN PATENT DOCUMENTS

| | | |
|---|---|---|
| 0 313 491 A1 | 4/1989 | European Pat. Off. . |
| 0 346 922 A2 | 12/1989 | European Pat. Off. . |
| 0 670 558 A2 | 2/1995 | European Pat. Off. . |
| 0 724 351 A2 | 7/1996 | European Pat. Off. . |
| 0 732 597 A1 | 9/1996 | European Pat. Off. . |
| 0 750 200 | 12/1996 | European Pat. Off. . |
| S63-52082 | 3/1988 | Japan . |
| 1 098 431 | 11/1982 | United Kingdom . |
| 2 193 359 | 2/1988 | United Kingdom . |
| 2 202 415 | 9/1988 | United Kingdom . |
| WO 89/05549 | 6/1989 | WIPO . |
| WO 94/19781 | 9/1994 | WIPO . |

OTHER PUBLICATIONS

"A Microwave Noncontact Identification Transponder Using Subharmonic Interrogation," Carol W. Pobanz, 8099 IEEE Transactions on Microwave Theory and Techniques, 43 (1995), Jul., No. 7, PT. II, New York, US, pp. 1673–1679.

"A Coded Radar Reflector For Remote Identification Of Personnel And Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.

*Primary Examiner*—Jacques H. Louis-Jacques
*Assistant Examiner*—Yonel Beaulieu
*Attorney, Agent, or Firm*—Christopher N. Malvone; Irena Lager

[57] ABSTRACT

A radio communications system is that can determine the location of an RFID Tag. The radio communication system includes at least one Interrogator for generating and transmitting a modulated radio signal to one or more Tags. The Interrogator is at a known location, and is in motion with respect to the Tag at a known velocity. One or more Tags of the system receive and demodulate the modulated radio signal, which contains a first information signal which specifies which Tag or Tags should respond using Modulated Backscattering. The Tag generates a subcarrier signal, and backscatter modulates the reflection of the radio signal using the subcarrier signal, thereby forming a reflected signal. The Interrogator receives and demodulates the reflected signal. The Interrogator then determines the Tag's relative direction from the location and velocity of the Interrogator, and from the Doppler shift of the subcarrier signal. More than one of such measurements allow the location of the Tag to be determined.

17 Claims, 7 Drawing Sheets

U.S. PATENT DOCUMENTS

| | | |
|---|---|---|
| 4,827,395 | 5/1989 | Anders et al. . |
| 4,888,591 | 12/1989 | Landt et al. . |
| 4,912,471 | 3/1990 | Tyburski et al. . |
| 4,937,581 | 6/1990 | Baldwin et al. . |
| 4,963,887 | 10/1990 | Kawashima et al. . |
| 4,993,068 | 2/1991 | Piosenka et al. . |
| 5,030,807 | 7/1991 | Landt et al. . |
| 5,039,994 | 8/1991 | Wash et al. . |
| 5,055,659 | 10/1991 | Hendrick et al. . |
| 5,086,391 | 2/1992 | Chambers . |
| 5,131,038 | 7/1992 | Puhl et al. . |
| 5,153,919 | 10/1992 | Reeds et al. . |
| 5,164,985 | 11/1992 | Nysen et al. . |
| 5,214,409 | 5/1993 | Beigel . |
| 5,214,410 | 5/1993 | Verster . |
| 5,227,803 | 7/1993 | O'Connor et al. ............ 342/442 |
| 5,251,218 | 10/1993 | Stone et al. . |
| 5,252,979 | 10/1993 | Nysen . |
| 5,264,854 | 11/1993 | Spiess . |
| 5,305,008 | 4/1994 | Turner et al. . |
| 5,305,459 | 4/1994 | Rydel . |
| 5,317,309 | 5/1994 | Vercellotti et al. . |
| 5,339,073 | 8/1994 | Dodd et al. . |
| 5,347,263 | 9/1994 | Carroll et al. . |
| 5,381,137 | 1/1995 | Ghaem et al. . |
| 5,390,339 | 2/1995 | Bruckert et al. . |
| 5,400,949 | 3/1995 | Hirvonen et al. . |
| 5,410,315 | 4/1995 | Huber ............................ 986/950 |
| 5,420,757 | 5/1995 | Eberhardt et al. . |
| 5,423,056 | 6/1995 | Linquist et al. . |
| 5,425,032 | 6/1995 | Shloss et al. ................. 194/674 |
| 5,426,667 | 6/1995 | van Zon . |
| 5,434,572 | 7/1995 | Smith . |
| 5,438,329 | 8/1995 | Gastouniotis et al. ........... 72/241 |
| 5,448,110 | 9/1995 | Tuttle . |
| 5,448,242 | 9/1995 | Sharpe et al. . |
| 5,455,575 | 10/1995 | Schuermann . |
| 5,461,385 | 10/1995 | Armstrong . |
| 5,463,402 | 10/1995 | Reddersen et al. . |
| 5,477,215 | 12/1995 | Mandelbaum . |
| 5,478,991 | 12/1995 | Watanabe et al. ............... 194/337 |
| 5,479,160 | 12/1995 | Koelle . |
| 5,479,416 | 12/1995 | Snodgrass et al. . |
| 5,485,520 | 1/1996 | Chaum et al. . |
| 5,491,484 | 2/1996 | Schuermann . |
| 5,510,795 | 4/1996 | Koelle . |
| 5,521,944 | 5/1996 | Hegeler et al. . |
| 5,523,749 | 6/1996 | Cole et al. . |
| 5,525,993 | 6/1996 | Pobanz et al. . |
| 5,525,994 | 6/1996 | Hurta . |
| 5,530,202 | 6/1996 | Dais et al. . |
| 5,543,798 | 8/1996 | Schuermann . |
| 5,559,828 | 9/1996 | Armstrong et al. . |
| 5,565,858 | 10/1996 | Guthrie ............................ 306/51 |
| 5,572,222 | 11/1996 | Mailandt et al. . |
| 5,581,576 | 12/1996 | Lanzetta et al. . |
| 5,590,158 | 12/1996 | Yamaguchi et al. . |
| 5,600,538 | 2/1997 | Xanthopoulos . |
| 5,610,939 | 3/1997 | Takahashi et al. . |
| 5,633,613 | 5/1997 | MacDonald . |
| 5,640,683 | 6/1997 | Evans et al. . |
| 5,649,295 | 7/1997 | Shober et al. ................... 455/38.2 |
| 5,649,296 | 7/1997 | MacLean et al. . |
| 5,686,920 | 11/1997 | Hurta et al. . |
| 5,686,928 | 11/1997 | Pritchett et al. . |
| 5,708,444 | 1/1998 | Pouwels et al. . |
| 5,727,027 | 3/1998 | Tsuda ............................ 775/707 |
| 5,774,673 | 6/1998 | Beuk et al. ..................... 673/882 |
| 5,774,876 | 6/1998 | Wolley et al. .................. 671/491 |
| 5,796,827 | 8/1998 | Coppersmith et al. .......... 749/865 |
| 5,804,810 | 9/1998 | Wolley et al. .................. 672/342 |
| 5,850,187 | 12/1998 | Carrender et al. .............. 623/327 |
| 5,852,403 | 12/1998 | Boardman ...................... 358/357 |
| 5,872,516 | 2/1999 | Bonge, Jr. et al. .............. 199/614 |
| 5,873,025 | 2/1999 | Evans et al. .................... 877/597 |
| 5,874,903 | 2/1999 | Shuey et al. .................... 870/640 |
| 5,929,779 | 7/1999 | MacLellan et al. ............. 866/934 |
| 5,940,006 | 8/1999 | MacLellan et al. ............. 571/4 |
| 5,952,922 | 9/1999 | Shober ........................... 775/701 |

MODULATED BACKSCATTER LOCATION SYSTEM

RELATED APPLICATIONS

Related subject matter is disclosed in the following application filed concurrently herewith and assigned to the same Assignee hereof: U.S. patent applications "Shielding Technology In Modulated Backscatter System", Ser. No. 08/777,770 (abandoned); "Encryption for Modulated Backscatter Systems", Ser. No. 08/777,832; "Antenna Array In An RDID System", Ser. No. 08/775,217; "QPSK Modulated Backscatter System", Ser. No. 08/775,694; "Modulated Backscatter Sensor System", Ser. No. 08/777,771; "Subcarrier Frequency Division Multiplexing Of Modulated Backscatter Signals", Ser. No. 08/777,834; "IQ Combiner Technology In Modulated Backscatter System", Ser. No. 08/775,695, now issued as U.S. Pat. No. 5,784,686; "In-Building Personal Pager And Identifier", Ser. No. 08/775,738 (abandoned); "In-Building Modulated Backscatter System", Ser. No. 775,701; "Inexpensive Modulated Backscatter Reflector", Ser. No. 08/774,499; "Passenger, Baggage, And Cargo Reconciliation System", Ser. No. 08/782,026. Related subject matter is also disclosed in the following applications assigned to the same assignee hereof: U.S. patent application Ser. No. 08/504188, entitled "Modulated Backscatter Communications System Having An Extended Range"; U.S. patent application Ser. No. 08/492,173, entitled "Dual Mode Modulated Backscatter System"; U.S. patent application Ser. No. 08/492,174, entitled "Full Duplex Modulated Backscatter System"; and U.S. patent application Ser. No. 08/571,004, entitled "Enhanced Uplink Modulated Backscatter System".

BACKGROUND OF THE INVENTION

1. Field of the Invention

This invention relates to wireless communication systems and, more particularly, to a wireless communication system using modulated backscatter technology.

2. Description of the Related Art

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. In RFID systems, the Interrogator communicates to the Tags using modulated radio signals, and the Tags respond with modulated radio signals. After transmitting a message to the Tag (called the Downlink), the Interrogator then transmits a Continuous-Wave (CW) radio signal to the Tag. The Tag modulates the CW signal using Modulated BackScattering (MBS) where the antenna is electrically switched, by the modulating signal, from being an absorber of RF radiation to being a reflector of RF radiation. This modulated backscatter allows communications from the Tag back to the Interrogator (called the Uplink). Conventional MBS systems are designed a) to identify an object passing into range of the Interrogator, and b) to store data onto the Tag and then retrieve that data from the Tag at a later time in order to manage inventory or perform another useful application.

As mentioned above, an RFID Tag can be used to identify an object in inventory. One of the problems in inventory applications is that, to identify the item, you must first know where the item is located. For example, using optically scanned bar codes, the optical bar code scanner must be very near the item in order to scan the bar code. RFID technology has improved this situation somewhat, in the sense that a greater range can be supported between the Tag and the Interrogator. However, RFID technology has range limitations, and the effective range of the best RFID technology is still small compared to the physical dimensions of a large warehouse.

Therefore, we consider the application of RFID technology to the problem of determining the location of an RFID Tag.

SUMMARY OF THE INVENTION

An embodiment of this invention provides methods for determining the location of a Tag, using Doppler processing. It is also disclosed how an overall location system for an environment such as a warehouse operates.

In accordance with an embodiment of the present invention, a radio communications system is disclosed that can determine the location of an RFID Tag. The radio communication system includes at least one Interrogator for generating and transmitting a modulated radio signal to one or more Tags. The Interrogator is at a known location, and is in motion with respect to the Tag at a known velocity. One or more Tags of the system receive and demodulate the modulated radio signal, which contains a first information signal which specifies which Tag or Tags should respond using Backscatter Modulator means. The Tag generates a subcarrier signal, and backscatter modulates the reflection of the radio signal using the subcarrier signal, thereby forming a reflected signal. The Interrogator receives and demodulates the reflected signal. The Interrogator then determines the Tag's relative direction from the location and velocity of the Interrogator, and from the Doppler shift of the subcarrier signal. More than one of such measurements allow the location of the Tag to be determined.

DETAILED DESCRIPTION

In this invention, we disclose a novel approach for determining the location of an RFID Tag using Doppler processing. We disclose here a set of methods for using a MBS RFID communications link, capable of supporting conventional RFID functions, for determining the location of an RFID Tag.

MBS Operation

Figure 1:
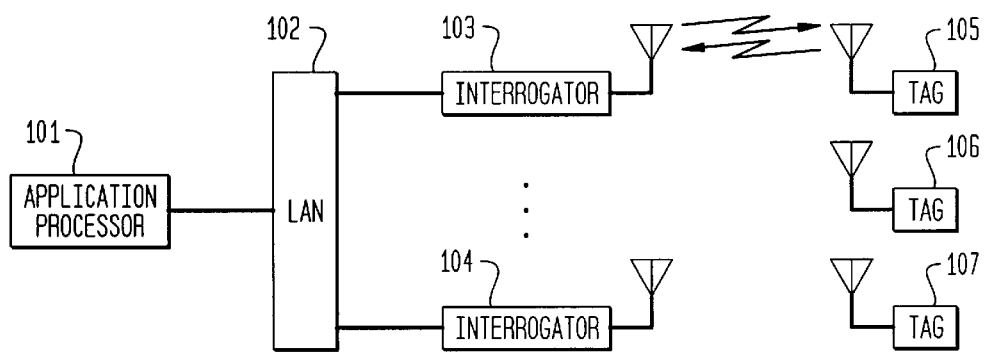
FIG. 1 shows a block diagram of an illustrative Radio Frequency Identification (RFID) system.
Figure 2:
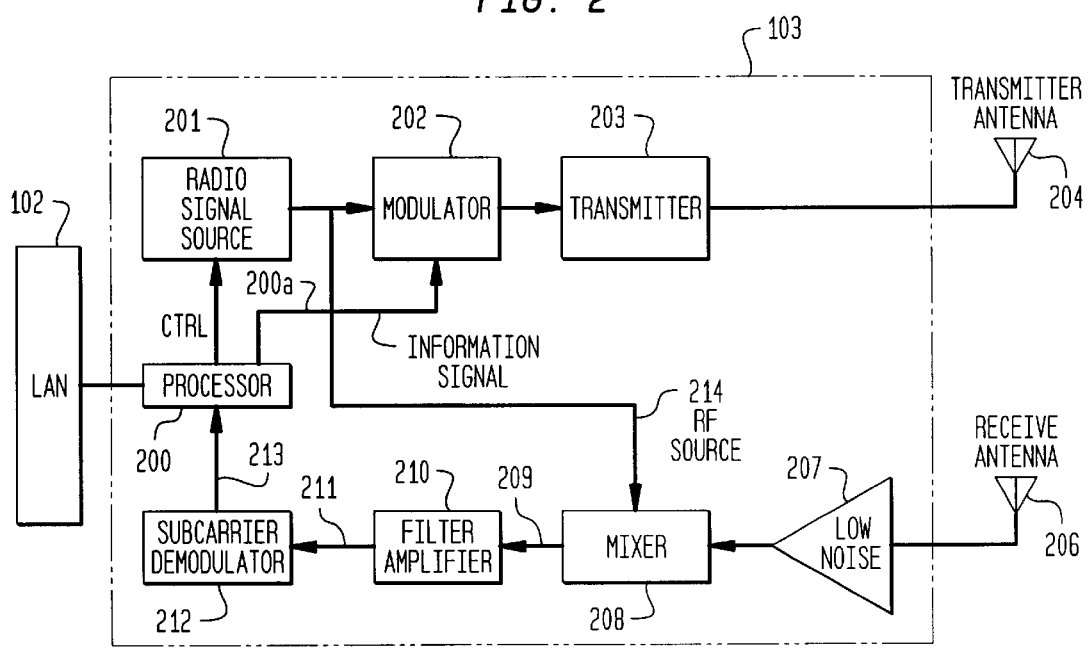
FIG. 2 shows a block diagram of an illustrative Interrogator Unit used in the RFID system of FIG. 1.

We now describe how a RFID system, utilizing MBS, operates. With reference to FIG. 1, there is shown an overall block diagram of a RFID system. An Applications Processor 101 communicates over Local Area Network (LAN) 102 to a plurality of Interrogators 103-104. The Interrogators may then each communicate with one or more of the Tags 105–107. For example and in reference to FIG. 2, the Interrogator 103 receives an information signal, typically from an Applications Processor 101. The Interrogator 103 takes this information signal and Processor 200 formats a Downlink message (Information Signal 200a) to be sent to the Tag. The information signal may include (200a) information such as information specifying which Tag is to respond (each Tag may have fixed a programmed identification number), instructions for the Tag's processor to execute or other information to be used and/or stored by the Tag's processor. With joint reference to FIGS. 1 and 2, Radio Signal Source 201 synthesizes a radio signal, the Modulator 202 modulates the radio signal using Information Signal 200a and the Transmitter 203 transmits this modulated signal via Antenna 204, illustratively using amplitude modulation, to a Tag. Amplitude modulation is a desirable choice because the Tag can demodulate such a signal with a single, inexpensive nonlinear device (such as a diode).

Figure 3:
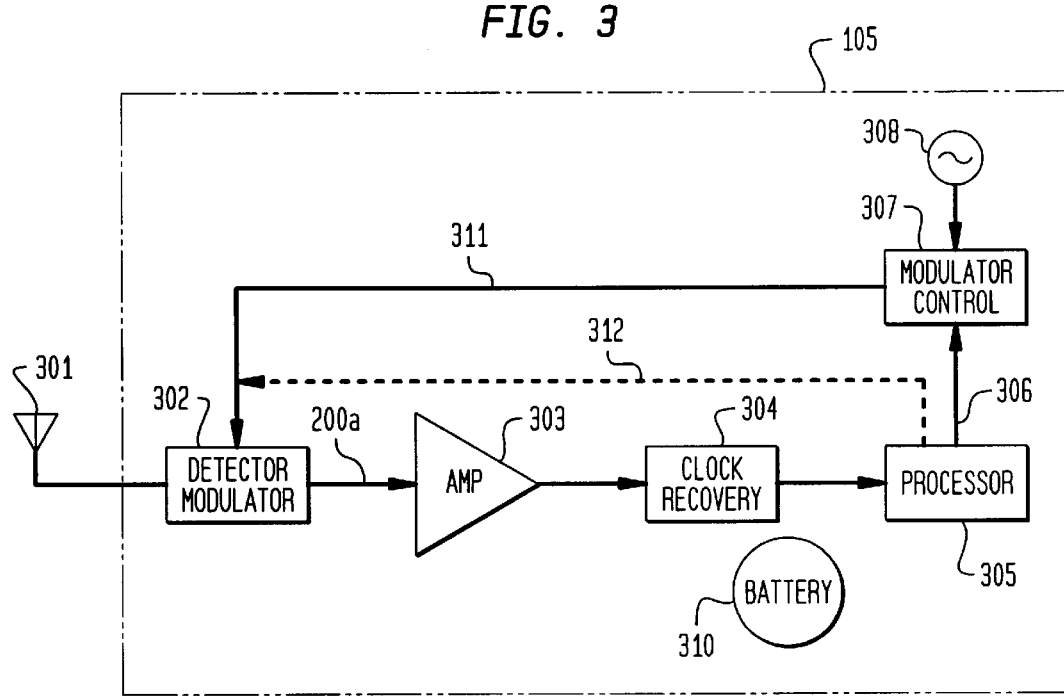
FIG. 3 shows a block diagram of a Tag Unit used in the RFID system of FIG. 1.

In the Tag 105 (see FIG. 3), the Antenna 301 (a loop or patch antenna) receives the modulated signal. This signal is demodulated, directly to baseband, using the Detector/Modulator 302, which, illustratively, could be a single Schottky diode. The result of the diode detector is essentially a demodulation of the incoming signal directly to baseband. The Information Signal 200a is then amplified, by Amplifier 303, and bit synchronization is recovered in Clock Recovery Circuit 304. If large amounts of data are being transferred in frames, frame synchronization may be implemented, for example, by detecting a predetermined hit pattern that indicates the start of a frame. The bit pattern may be detected by clock recovery circuit 304 or processor 305. Bit pattern detection is well known in the art. Clock recovery circuits such as a circuit that recovers a clock from Manchester encoded data are well known in the art. The resulting information from clock recovery circuit 304 is sent to a Processor 305. The Processor 305 is typically an inexpensive 4 or 8 bit microprocessor and its associated memory, and it generates an Information Signal 306 based on the particular program being executed by processor 305. Signal 306 is eventually communicated to be sent from the Tag 105 back to the Interrogator (e.g., 103). Information Signal 306 is sent to a Modulator Control Circuit 307, which uses the Information Signal 306 to modulate a subcarrier frequency generated by the Frequency Source 308 to produce signal 311. The Frequency Source 308 may be a crystal oscillator separate from the Processor 305, or a signal derived from the output of a crystal oscillator, or it may be a frequency source derived from signals present inside the Processor 305—such as a divisor of the fundamental clock frequency of the Processor. The Modulated Subcarrier Signal 311 is used by Detector/Modulator 302 to modulate the RF signal received from Tag 105 to produce a modulated backscatter (i.e., reflected) signal. This is accomplished, for example, by switching on and off the Schottky diode of Detector/Modulator 302 using the Modulated Subcarrier Signal 311, thereby changing the reflectance of Antenna 301. A Battery 310 or other power supply provides power to the circuitry of Tag 105. Power may also be received, for example, by using inductive coupling or microwaves.

It has been found that considerable advantages are present to an MBS design that uses a single frequency subcarrier. Many modulation schemes are possible; Phase Shift Keying (PSK) of the subcarrier (e.g., BPSK (Binary PSK), QPSK (Quadrature PSK)), more complex modulation schemes (e.g., MSK (Minimum Shift Keyed), GMSK Gaussian Minimum Shift Keyed)), etc.

Returning to FIG. 2, the Interrogator 103 receives the reflected and modulated signal with the Receive Antenna 206, amplifies the signal with a Low Noise Amplifier 207, and demodulates the signal using homodyne detection in a Quadrature Mixer 208. (In an alternative embodiment, a single antenna may replace Transmit antenna (204) and Receive Antenna (206). In this event, an electronic method of canceling the transmitted signal from that received by the receiver chain is needed; this could be accomplished by a device such as a Circulator.) Using the same Radio Signal Source 201 as used in the transmit chain means the demodulation to baseband is done using Homodyne detection; this has advantages in that it greatly reduces phase noise in the receiver circuits. The Mixer 208 then sends the Demodulated Signal 209 (if a Quadrature Mixer, it would send both I (in phase) and Q (quadrature) signals) to the Filter/Amplifier 210. The resulting filtered signal—then typically an Information Signal 211 carried on a subcarrier—is then demodulated from the subcarrier in the Subcarrier Demodulator 212, which then sends the Information Signal 213 to a Processor 200 to determine the content of the message. A subcarrier demodulator may be implemented using a simple analog to digital (A/D) converter and a digital signal processor (DSP) for more complex applications. For example, a diode may be used for amplitude modulated subcarriers and the DSP may be used for PSK modulated subcarriers. The I and Q channels of Signal 209 can be combined in the Filter/Amplifier 210, or in the Subcarrier Demodulator 212, or they could be combined in the Processor 200.

Using the above techniques as an example, an inexpensive, short-range, bi-directional digital radio communications channel is implemented. These techniques are inexpensive as the components consist of (for example) a Schottky diode, an amplifier to boost the signal strength, bit and frame synchronization circuits, an inexpensive 4 or 8 bit microprocessor, subcarrier generation circuits, and a battery. Most of these items are already manufactured in large quantities for other applications, and thus are not overly expensive. The circuits mentioned above for bit and frame synchronization and for subcarrier generation may also be implemented in logic surrounding the microprocessor core; thus, except for a relatively small amount of chip real estate, these functions come almost "for free."

Relative Velocity

Figure 4:
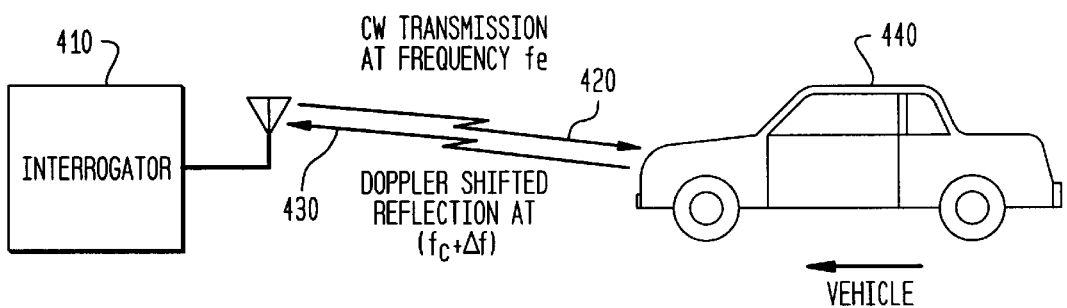
FIG. 4 shows a simplified block diagram of a radar system.

We first discuss how a MBS system is used to determine the relative velocity between an Interrogator and, for example, a vehicle. For this example, assume that the vehicle is moving in a constant direction and at a constant velocity during the period of time the measurement will be taken. To determine the velocity, an MBS system similar to a CW police Doppler radar system is used. A simple Doppler radar system, illustrated in FIG. 4, uses a CW signal (420) transmitted from the Interrogator (410) which is then reflected by a moving vehicle (440). The reflected signal (430) would be frequency shifted ($\Delta f$, see 430) from the RF carrier ($f_c$, see 420) as a result of a Doppler shift from the moving vehicle. The formula that relates a Radar Doppler Shift ($\Delta f$) to Relative Velocity (v) is Eq. 1 below. This formula is:

$$v = \Delta f \cdot \lambda / 2 \quad (1)$$

where $\lambda$ is the wavelength of the RF carrier $f_c$. The reason Eq. 1 has the factor of "2" is that this equation is for Radar Doppler Shifts, which have two Doppler Shifts.

Figure 5:
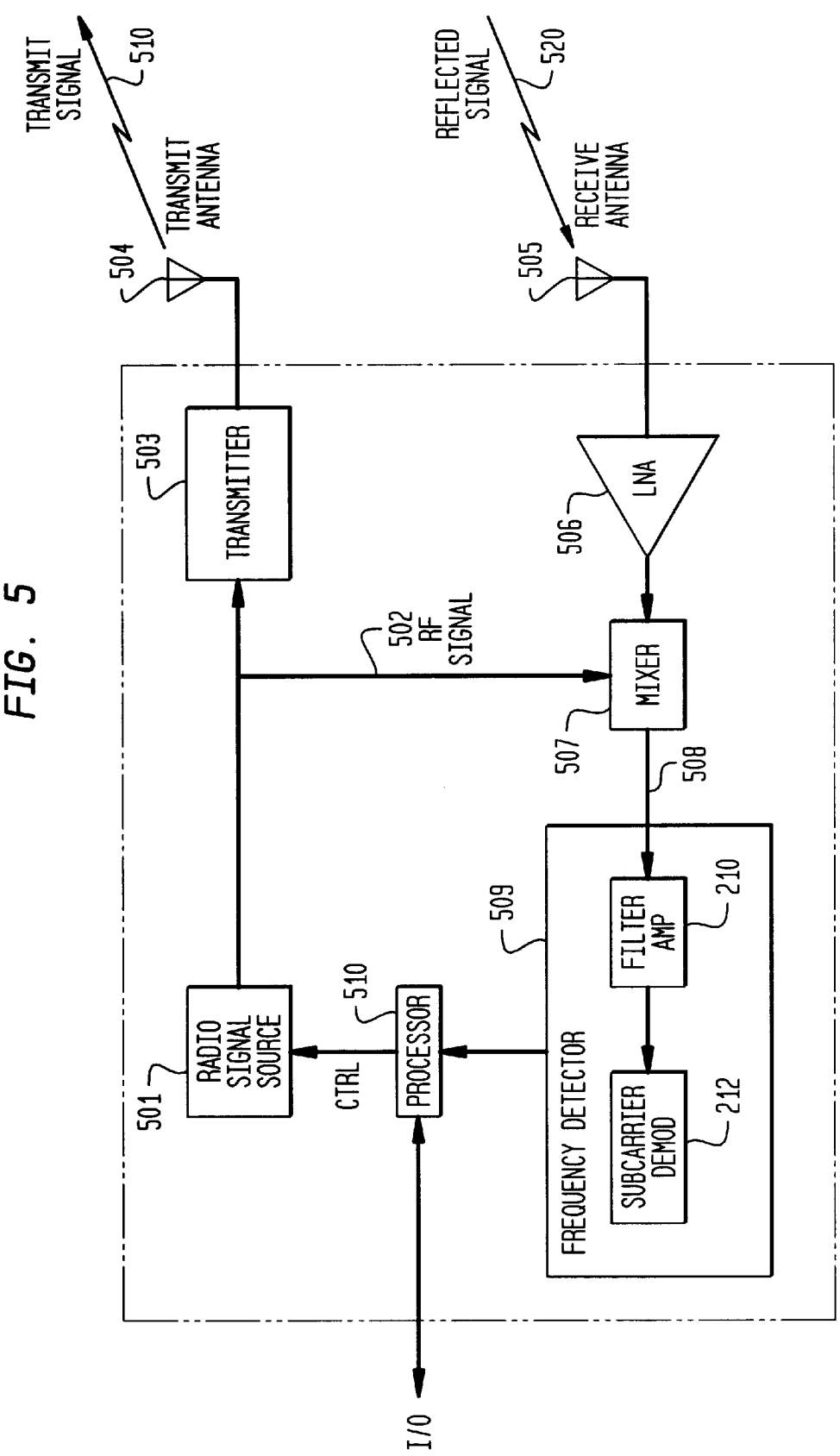
FIG. 5 shows a more detailed block diagram of a RFID Interrogator of a radar system.

The frequency shift $\Delta f$ is detected in the Interrogator (410) as follows. A more detailed block diagram of an Interrogator implementing this method is shown in FIG. 5. The Radio Signal Source (501) generates a CW RF signal, which is then transmitted by the Transmitter (503) using the Transmit Antenna (504). This signal is called the Transmit Signal (510). The Reflected Signal (520) is received by the Receive Antenna (505) and amplified by the Low Noise Amplifier (506). (Note that radar systems can also be implemented using a single Transmit/Receive Antenna.) The Mixer (507) then mixes the RF Source (502) signal, which comes from the Radio Signal Source (501) to produce signal 508. (The use of the same Radio Signal Source (501) as the input to the Mixer (507) constitutes Homodyne Detection.) The difference between $f_c$ and the frequency of the Reflected Signal (520)—i.e., the Doppler shift—is $\Delta f$. The frequency $\Delta f$ of signal 508 is determined by frequency detector 509, and control processor 510 determines the relative velocity using the value of $\Delta f$ which can then be mathematically converted into the relative velocity between the Interrogator and the vehicle, using Eq. 1, since the RF carrier frequency $f_c$ is known. At this point we note the presence of an ambiguity. The above procedure can determine the absolute magnitude of the Doppler shift $\Delta f$, however in the absence of other information it cannot determine the sign of $\Delta f$; i.e., it cannot determine whether the Interrogator and the vehicle are moving towards each other or moving away from each other. Other data is required to resolve this ambiguity.

One of the classic difficulties of this approach to velocity determination is that the Doppler shift $\Delta f$ can be relatively small. For example, consider an RF carrier at 2.45 GHz, and a velocity of 10 meters/second. The Doppler shift $\Delta f$ is then 163 Hz. If one examines the noise spectrum of the output (508) of the Mixer (507), it is common for phase noise to be substantial at this baseband frequency, especially if inadequate isolation exists between the Transmit Antenna (504) and the Receive Antenna (505). Also, since almost everything reflects microwave radiation to some degree, a large amount of reflections are received in a radar system; this is called "clutter." Furthermore, almost any mechanical or electronic device in the radar's field of view not only reflects microwave radiation but also modulates that reflection; e.g., a motor turning at a certain rate will cause modulated reflections at a frequency $\Delta f$ away from the RF carrier. These modulated reflections will be difficult to distinguish from the Doppler shifted signatures of objects whose velocity is being measured.

Doppler Shifted Subcarrier

We now disclose a method by which an Interrogator determines the relative velocity between itself and a cooperative Tag by using a Doppler shifted subcarrier. We note that an RFID system can achieve extended range by using a precise frequency subcarrier ($f_s$), digital signal processing, and precise location of the subcarrier with respect to harmonics of the AC power line frequency. In an embodiment of the current invention, a narrowband subcarrier at frequency $f_s$ is used. This narrowband subcarrier may be detected at great distances due to the small noise bandwidth, and the fact that the subcarrier is located at a frequency $f_s$ away from the RF carrier frequency $f_c$ such that the "clutter" noise is greatly reduced.

Figure 6:
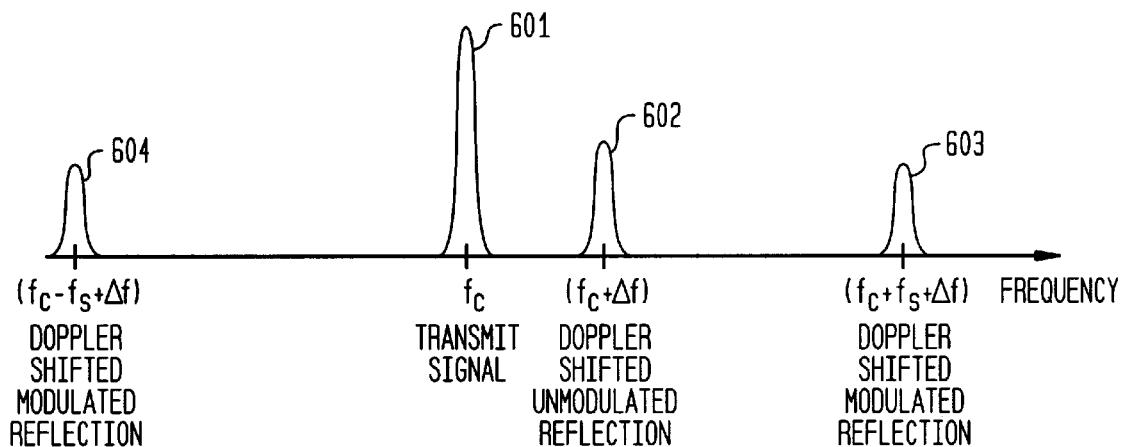
FIG. 6 shows the relative positions of the signals in frequency space before demodulation.
Figure 7:
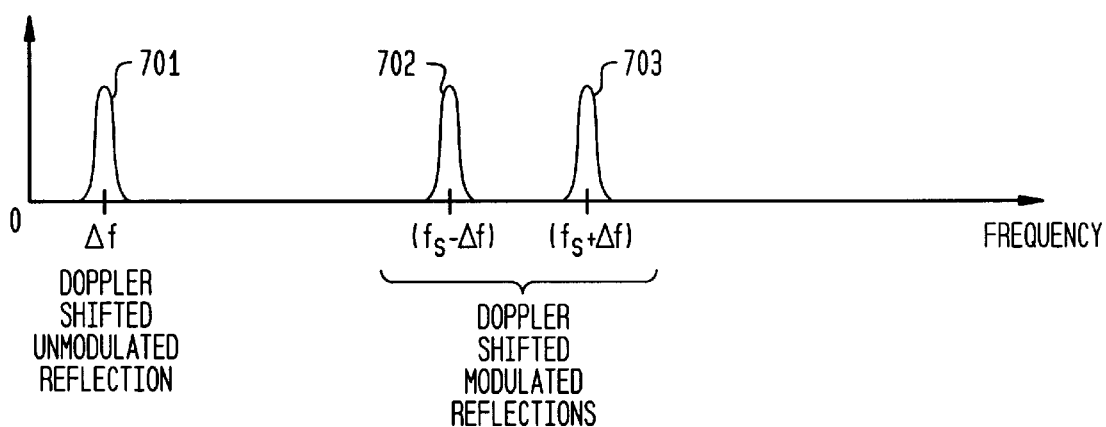
FIG. 7 shows the relative positions of the signals in frequency space after demodulation.

We now consider the effects of Doppler on an RFID system using a narrowband subcarrier signal. Assume for simplicity that the RFID Tag is moving towards the Interrogator (a similar analysis holds for the RFID Tag moving away from the Interrogator). Let us use $\Delta f$ as two-way Doppler shift (as used in Eq. 1). The Interrogator (103) transmits the RF signal at frequency $f_c$ to the Tag (105). The Tag (105) generates the subcarrier frequency $f_s$ within frequency source 308 (see FIG. 3). In one embodiment, assume that the Modulator Control (307) performs no additional modulation. Thus, the frequency $f_s$ is applied to the Detector/Modulator (302), which mixes with the incoming CW frequency at $f_c$. The result of this process are received by the Interrogator 103: a Doppler Shifted Unmodulated Reflection (602), at frequency ($f_c+\Delta f$), and Doppler Shifted Modulated Reflections (604) at frequency ($f_c-f_s+\Delta f$) and Doppler Shifted Modulated Reflection (603) at frequency ($f_c+f_s+\Delta f$). (It should be noted that a more complex derivation of the received signals yield the same results.) The relative positions of these signals are shown in FIG. 6. After demodulation through the Mixer (507), the signals (509) appear as shown in FIG. 7. The Doppler Shifted Unmodulated Reflection (602) is the signal discussed above that is processed in a typical radar system; it generally is of the order of a few hundred Hertz and is thus detectable as a low frequency audible sound. The Doppler Shifted Unmodulated Reflection (602) can be used to determine the relative velocity of an object or objects in the RF field; however, multiple items might be moving in the RF field with different velocities. In this case, multiple Doppler Shifted Unmodulated Reflections (602) with different values of $\Delta f$ would be present, and it may not be clear which reflection represents the movement of the Tag. This is a classic problem in radar to determine which signal represents the true target, and which signals are "clutter" from other sources of reflection. Therefore, to measure the relative velocity between the Tag and the Interrogator, we use the Doppler shifted subcarrier signals; thus we are interested in signals 702 and 703, which are the Doppler Shifted Modulated Reflections at baseband frequencies ($f_s-\Delta f$) and ($f_s+\Delta f$), respectively. The "bandwidth" of these two signals, or the distance between the center frequency of these signals, is equal to $2\Delta f$. It should be noted that if the relative velocity between the Interrogator and the Tag is constant, the signals received will be two tones at frequencies ($f_s-\Delta f$) and ($f_s+\Delta f$), with no signal between these two tones. Thus, we will refer to the "bandwidth" of these signals as the distance between the centers of these tones. As above, we note a fundamental ambiguity in the determination of the sign of $\Delta f$. Since two identical signals, one located at ($f_s-\Delta f$) and another located at ($f_s+\Delta f$) are present, it is not possible without additional information to determine whether the Interrogator and the Tag are moving towards each other or moving away from each other.

Therefore, to determine the relative velocity between the Tag and an RFID Interrogator similar to the Interrogator of FIG. 1, we filter and amplify the signal 508 through the Filter Amplifier 210. The filter would be centered around the subcarrier frequency $f_s$, and would have a bandwidth sufficiently wide to pass the largest $2\Delta f$ bandwidth signal that is expected. (In practice, if relative velocity is being measured in the same system with traditional RFID communications, the bandwidth of the Filter Amplifier (210) will be wide enough to pass the Uplink signals from Tag to Interrogator; these signals can easily be 100 kHz or more in bandwidth, centered around the subcarrier frequency $f_s$.) To detect the bandwidth ($2\Delta f$) of the signal, the Subcarrier Demodulator (212), which for normal RFID communications is used to extract the Information Signal (213) from the demodulated and filtered signal (211), is for this case used to measure the "bandwidth" of the signal present at the subcarrier frequency $f_s$. Once the signal bandwidth $2\Delta f$ is known, Eq. 1 can be used to calculate the relative velocity v.

To measure the bandwidth of the signal present at the subcarrier frequency $f_s$, several techniques may be used. We note that the frequency $f_s$ is generally much larger than the signal bandwidth $2\Delta f$. For example, the subcarrier frequency $f_s$ could range from 32 kHz to 1 MHz; while the signal bandwidth $2\Delta f$ would be 327 Hz (for a velocity of 10 meters/second and an RF carrier frequency of 2.45 GHz). Given the fact that $2\Delta f$ is much smaller than $f_s$, the Subcarrier Demodulator (212) undersamples the signal, perhaps for example, at a sample rate of 1–10 kHz, and then processor 510 or a DSP within subcarrier demodular (212) performs a Fourier analysis of the undersampled signal to determine the frequency modes present. The result of this Fourier transform is a direct measurement of $\Delta f$, since the signals located at $(f_s-\Delta f)$ and at $(f_s+\Delta f)$ represent the results of a signal of frequency $\Delta f$ mixed with a signal of frequency $f_s$.

It should be noted that while we are directly measuring the value of $\Delta f$, this value is not dependent on the frequency $f_s$. The RFID Tag (103) generates the frequency $f_s$, using an inexpensive crystal. For example, it is common for inexpensive crystals to have frequency accuracy of ($\pm 100$ ppm); therefore a 32 KHz crystal would have a frequency accuracy of $\pm 3.2$ Hz. In the above measurement, we are not concerned with exactly where in the frequency domain the signals lie, but rather, once the signals have been located, to accurately determine the value of $\Delta f$.

Location Determination

Figure 8:
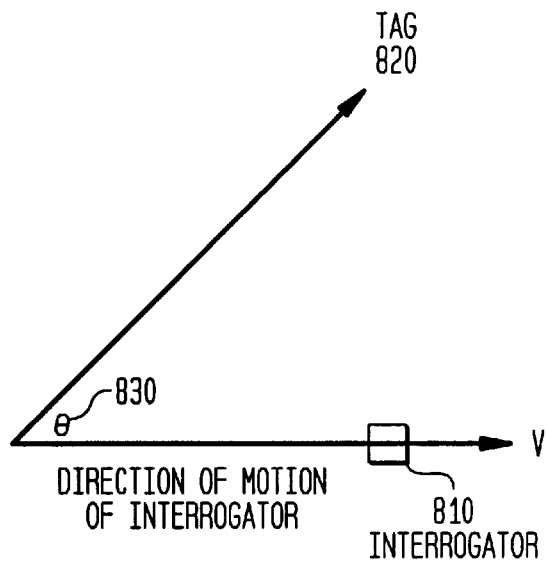
FIG. 8 shows the relative positions between the moving Interrogator and the Tag.

We now disclose a method by which Doppler effects between a moving Interrogator and a Tag may be used to determine the location of the Tag. We first note that the location problem considered here is similar to "Synthetic Aperture" radar problems, and also similar to towed sonar array problems. This problem is unique, however, since the Tag can cooperate in the location determination by reflecting a subcarrier signal at a known frequency, thus enabling the Interrogator to detect and process the reflected signal. With reference to FIG. 8, we note that the Doppler shift $\Delta f$ from a fixed RF Tag (820) being interrogated by a moving Interrogator (810) is given by Eq. 2, where $$\Delta f=(2v/\lambda)\cos(\theta) \quad (2)$$

where $\lambda$ is the wavelength of the RF carrier frequency, v is the speed of the Interrogator, and $\theta$ (830) is the angle between the direction of the Interrogator's (810) motion and the direction to the Tag (820). Since $\lambda$ is known, $\Delta f$ can be measured as disclosed above, using the Doppler shift of the subcarrier frequency $f_s$. The velocity v and direction of motion of the Interrogator, can be measured separately; we assume that the motion of the Interrogator is under our control. Therefore, given the Doppler shift $\Delta f$, we can determine the angle $\theta$ between the direction of the Interrogator's (810) motion and the direction to the Tag (820). One key assumption made here, the effects of which are discussed below, is that the distance traveled by the Interrogator during the measurement period must be small in comparison to the distance from the Interrogator to the Tag; we call this the "small distances" assumption.

The precision of the direction measurement is determined by how the Tag's (820) modulated backscatter return signal is processed. The resolution ($\delta f$) of the Doppler measurement for a CW carrier is inverse to the time duration (T) of the processed pulse, or $$\delta f=1/T. \quad (3)$$

Consider the case of the Tag (820) being located broadside (perpendicular) to the Interrogator's (810) motion. The direction to the Tag (820) relative to the Interrogator's (810) motion is given by $$\theta=\pm 90°+(\Delta f \lambda)/(2v). \quad (4)$$

The angular resolution is determined by the Doppler resolution, or $$\delta\theta=(\delta f \lambda)/(2v)=\lambda(1/(2vT)). \quad (5)$$

We note that this is equivalent to the angular resolution of an antenna whose aperture length, L, is equal to 2vT; i.e., twice the distance that the Interrogator traverses during the period of time of the CW pulse transmission. This processing approach enables very high precision determination of the direction of a Tag (820) being interrogated, while using a very small physical antenna. As an example, consider an Interrogator (810) moving at 10 mph (4.5 m/s). This Interrogator (810) can interrogate a Tag (820) using a CW carrier with a duration of 1 second. The effective antenna size (at broadside) is then 9 meters with an angular resolution of better than 1°, using a physical antenna size of only a few centimeters.

To implement this method, we use the same technique disclosed above. The signals received by the Interrogator, after Homodyne demodulation, are two tones at frequencies $(f_s-\Delta f)$ and $(f_s+\Delta f)$. In one embodiment, the signal is undersampled, and a Fourier transform is performed to directly determine $\Delta f$. Therefore, we can determine the Doppler shift $\Delta f$, and using Eq. 1, we determine the angle $\theta$.

Figure 9:
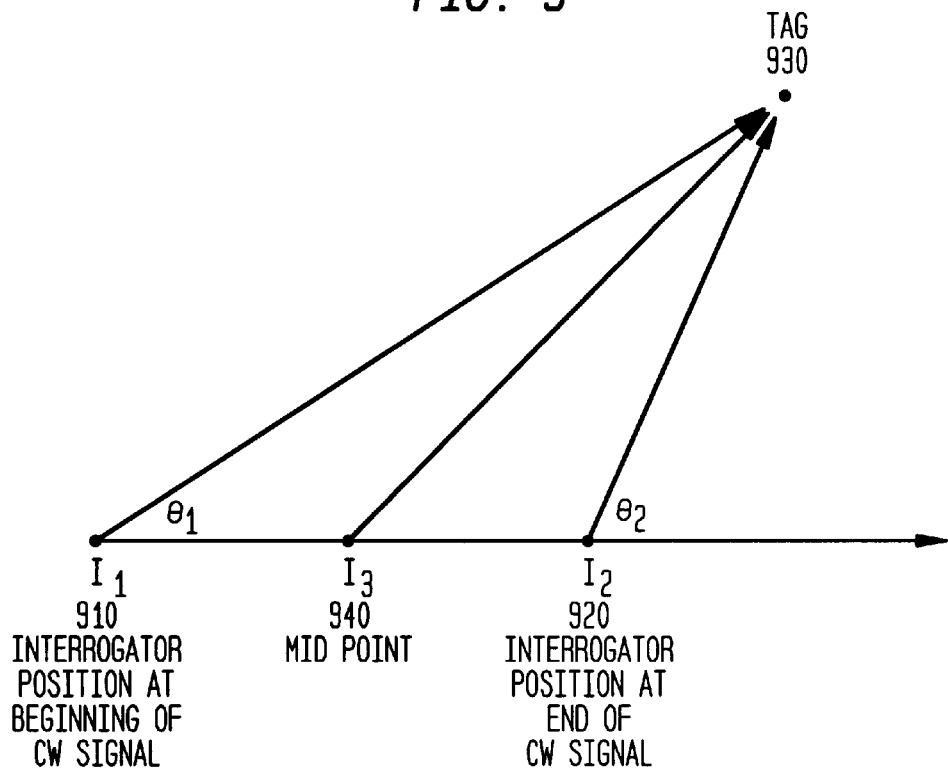
FIG. 9 shows the relative position between the moving Interrogator and the Tag during the time period T of the measurement.

We now consider the impact of the "small distances" assumption. With reference to FIG. 9, an Interrogator begins at point $I_1$ (910) and travels to point $I_2$ (920) during the CW transmission period T. The angle from the direction of travel of the Interrogator to the Tag 930 is $\theta_1$, at the beginning of the time period T and $\theta_2$ at the end of time period T. As an example, assume the Interrogator moving at the same 4.5 m/s as above, and T=1 second. Then, the Interrogator moves 4.5 m during that one second. Let us fuirther assume that the Tag 930 is 10 meters from point $I_1$, and that the angle $\theta_1$ is 45°. Then, we can calculate the angle $\theta_2$ as 70°. Thus, in this example, the angular error is 25°. Therefore, we should consider the effects of the "small distances" assumption on the angular resolution.

We now disclose techniques to decrease the angular error from the "small distances" assumption. Let us consider in more depth the reflected signal that the Interrogator (103) will receive from the Tag (105) when the Interrogator (103) is in motion with respect to that Tag (105). In this case, the Doppler shift $\Delta f$ changes during the time duration T, since the angle $\theta$ changes. In the case of FIG. 9, the Doppler shift $\Delta f$ will be greatest at the beginning of the time duration T (since $\theta_1<\theta_2$) and least at the end of the time duration T. Assume, for example, the method used by the Interrogator to determine $\Delta f$ involves sampling the demodulated subcarrier signal and performing a Fourier analysis of the sampled signal to determine the frequencies of the signals present. Let $\Delta f_1$ be the value of $\Delta f$ at the beginning of the time duration T, and let $\Delta f_2$ be the value of $\Delta f$ at the end of the time duration T, where in this case ($\Delta f_1>\Delta f_2$). Then, following the above discussion, we observe that after demodulation, two signals will be found. One signal will span from $\{(f_s-\Delta f_1)$ to $(f_s-\Delta f_2)\}$, and the other signal will span from $\{(f_s+\Delta f_2)$ to $(f_s+\Delta f_1)\}$. Within each of these signal spans, there will be a continuum of signals, since the Interrogator 810 is assumed to be moving at a constant velocity, and therefore the angle θ, and the Doppler shift Δf will vary smoothly. As disclosed above, these signals may be undersampled, and a Fourier Transform performed. The results of the Fourier Transform will be a continuum of signals ranging from frequency $\Delta f_1$ to frequency $\Delta f_2$.

One simple method that may be used is for the Interrogator (103) to select the mid-point of the range ($\Delta f_1$, $\Delta f_2$), as an estimate for Δf. The position of the Interrogator, from which the angle θ is measured, should be taken as the mid-point $I_3$ (940) between location $I_1$, (910) and location $I_2$ (920) of FIG. 9. Therefore, this method partially compensates for the angular resolution error made due to the "short distances" problem; specifically, it reduces the angular error by a factor of two. We note, in the event that during the time period T the Interrogator 801 passes the "perpendicular" to the Tag 820, the angular resolution error will be greater. This is true since an ambiguity will be present in the determination of the angle $\theta_2$, since we will not know in general on which side of the perpendicular the angle $\theta_2$ is located. To resolve this ambiguity, as the Interrogator travels, several measurements may be taken. If one measurement involves this ambiguity, then the results of the measurement will not appear consistent with the results of other measurements, and the inconsistent measurement may be discarded.

We therefore conclude that the determination of the time duration T and the Interrogator velocity v is an optimization problem involving conflicting criteria. As shown above, the longer the time duration T, the more accurate the angular resolution since the equivalent antenna aperture becomes large. Another factor in favor of lengthening the time period T is the fact that a longer CW signal will be more easily and reliably detected by the Interrogator, as increasing the time duration that the Interrogator has to "listen" will increase total received signal energy and thus improve the signal-to-noise ratio. However, increasing the distance traveled by the Interrogator during the time period T (i.e., increasing vT) will increase the angular error due to the "short distances" problem. Since the distance from the Interrogator to the Tag is not known in general, no closed form optimum values of T and v can be derived. However, experience with MBS systems indicate that a CW time duration of a few tenths of a second is adequate to receive the reflected subcarrier signal at distances useful for an inventory application. Therefore, for example, given a time duration T of 0.2 seconds, and an Interrogator 810 velocity of 4.5 m/s, then the Interrogator travels 0.9 meters during the time period T. The angular resolution, given the above formulas, is 4°. From the "small distances" approximation, again using a 10 meter distance from the Interrogator to the Tag (at the beginning of the measurement period T), and using an initial angle $\theta_1$, of 45°, then we calculate the final angle $\theta_2$ to be 49°. Using the technique disclosed above, this angular error of 4° will be halved. Therefore, for this example, the angular resolution is 4°, and the angular error from the "small distances" assumption is 2°. Therefore, these parameters appear to yield reasonable location performance.

Figure 11:
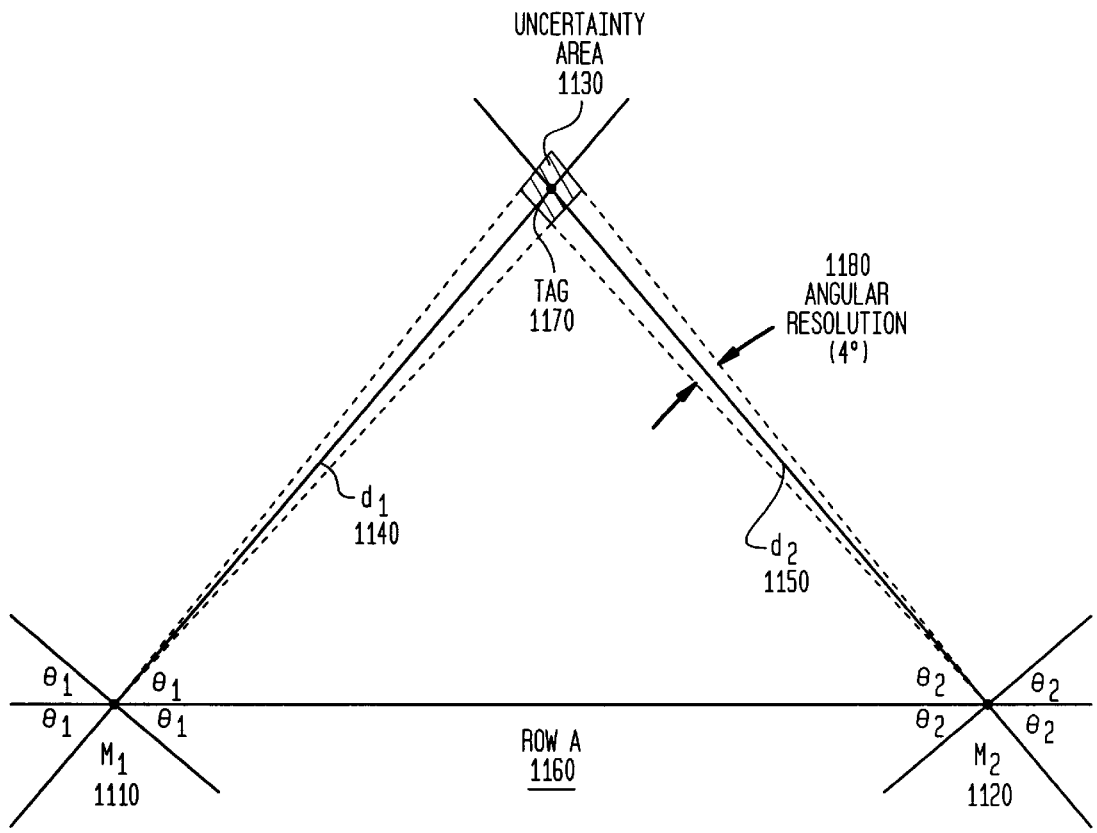
FIG. 11 shows how a specific Tag can be located based upon two measurements.

We note in general that using solely Doppler processing for direction determination has a number of inherent ambiguities, as mentioned above. For example, and in reference to FIG. 11 from the measurement at location $M_1$, the angle $\theta_1$ to the Tag 1170 may be in one of any four directions. The same is true for the measurement at location $M_2$. These ambiguities can be removed in a number of ways. One solution is the use of a directional antenna. Directionality that confines either the transmitter and/or the receiver beams to only one side (half-space) of the space divided by the Interrogator (810) motion is sufficient. Another solution is that when triangulation is used for location, three tag direction determinations performed from non-collinear Interrogator positions are sufficient to resolve the ambiguity, even while using an omnidirectional antenna. Still another solution is to use the signal strength of the received signal as additional data.

Finally, in the above analysis it has been assumed that a line of sight path exists between the Interrogator 810 and the Tag 820. In a real application, if a line of sight path does not exist, the RF propagation path will be a summation of reflected signals. In that event, the result of using the Doppler technique will be a "smearing" of the received signals over several different Doppler frequency shifts; this will cause a certain degree of inaccuracy in the resulting location measurement. In a warehouse situation in which a line of sight path does not exist from each Tag 820 to corridors along the floor of the warehouse, but in which a line of sight path does exist from each Tag 820 to the ceiling of the warehouse, it may be helpful to mount the Interrogators 810 in the ceiling and have them move along ceiling tracks rather than have the Interrogators move along the floor of the warehouse.

We now summarize the above. An Interrogator 810 moves at a fixed velocity in a specific direction (FIG. 8). During the period of time the Interrogator is moving, it transmits messages to a specific Tag 820, using the MBS communications methods disclosed above, and requests the Tag 820 to generate a subcarrier signal, and backscatter modulates the CW signal transmitted by the Interrogator 810 with that subcarrier signal. The Interrogator then takes a set of measurements, each of time duration T. (Note there is no requirement that the time duration T be constant for each measurement; however if this is the case, it simplifies the Interrogator hardware and firmware.) The Interrogator receives the backscatter modulated signal, and performs Homodyne detection to produce I and Q signals. The I and Q signals are combined, amplified, and filtered. The resulting signal spans $\{(f_s-\Delta f_1)$ to $(f_s-\Delta f_2)\}$ and $\{(f_s+\Delta f_2)$ to $(f_s+\Delta f_1)\}$. The frequency components present within this signal may be determined by undersampling the signal, and using a Fourier Transform to measure the frequencies which range from $\Delta f_1$ to $\Delta f_2$. Then, the mid-point of this signal is calculated, and that mid-point used as an estimate of Δf. Since Δf is now known, and the velocity of the Interrogator v is also known, the angle θ (830) may be calculated from Eq. 2. The Interrogator position from which this angle θ applies is the Mid Point (940). The result of several measurements will be a series of data, such as ($I_3$, D, θ); i.e., when the Interrogator was located at point $I_3$, moving in a Direction D, the angle from Direction D to the Tag was θ.

Location Mode A

Figure 10:
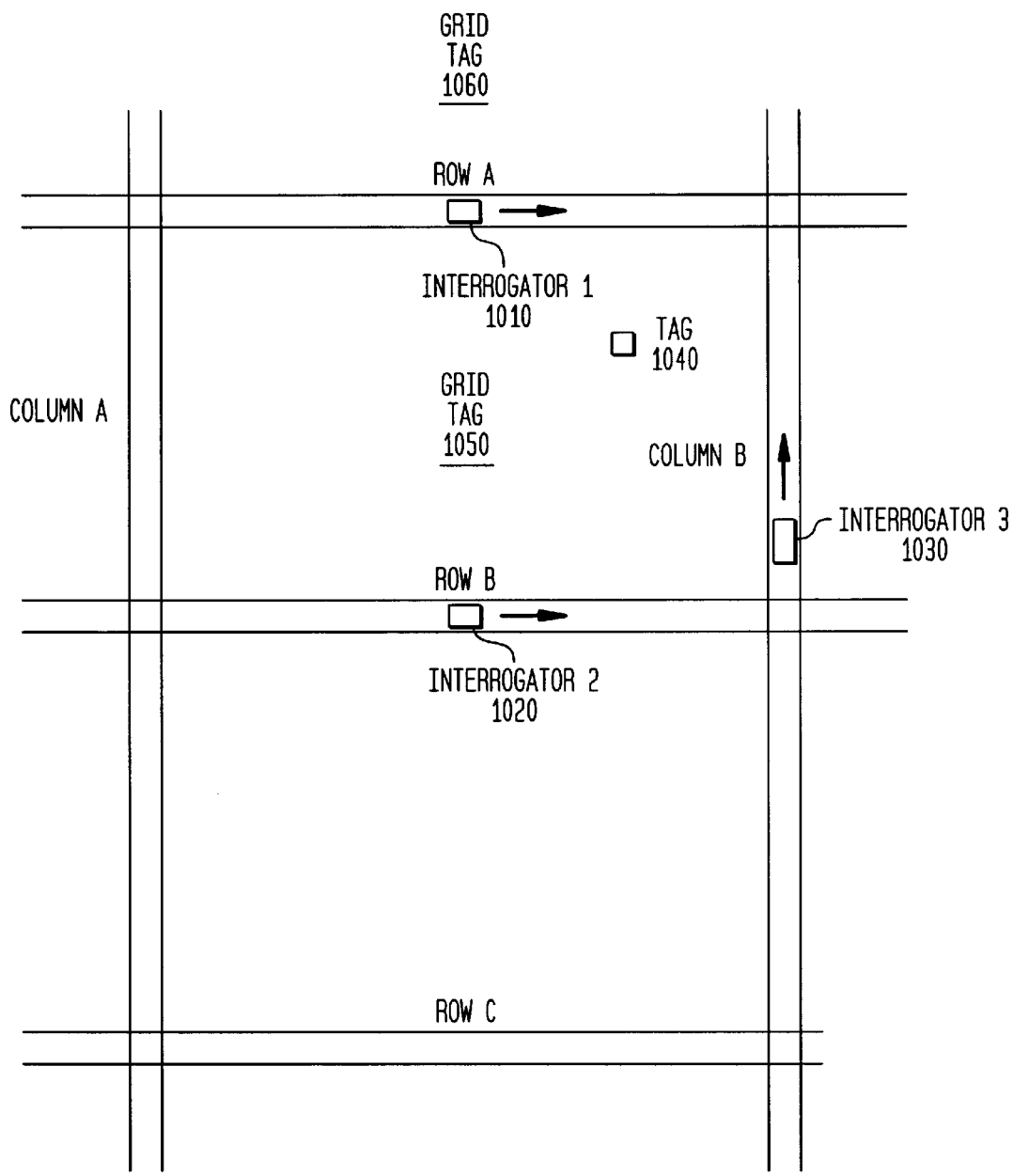
FIG. 10 shows how multiple measurements can be taken in order to locate a specific Tag.

We now disclose two methods for determining the location of a specific Tag 105 using the methods disclosed above. Location Mode A uses triangulation from a single mobile Interrogator, or from multiple mobile Interrogators, to determine the absolute location of the desired Tag. The interrogators exchange information using, for example, a wireless LAN (local area network). They may also exchange information with a central computer processor or server. This is particularly important in applications where mapping out the locations of Tags and the objects to which they are attached is a major objective. This basic approach, as illustrated in FIG. 10, is to use the directions to a Tag from two or more Interrogator positions to determine the location of the Tag according to some coordinate system. As shown in FIG. 10, Interrogator 1 (1010) moves along Row A (which could be a corridor), Interrogator 2 (1020) moves along Row B, and Interrogator 3 (1030) moves along Column B. Each of these Interrogators perform a search for the Tag (1040) as disclosed above. The absolute location of the Tag 1040 can then be determined from triangulation. Alternately, a single Interrogator could be used; this Interrogator (1010) may travel down Row A, and take multiple measurements during the time it is traveling Row A, as outlined above. The same Interrogator (1010) may then travel up Column B, and take another set of measurements.

This approach requires the determination of the location of the Interrogator within some coordinate system. A number of approaches are possible for determining the Interrogator location:

1. Global Positioning System (GPS); this is particularly applicable in open spaces, such as fields, deserts, etc.
2. Radio Grid. This method involves simultaneous direction measurements of benchmarked tags of fixed known locations.
3. Marked Location. In this method, location pulses are triggered when the Interrogator moves over known fixed points. These known fixed points could be Tags laid down at known locations, etc.
4. Other navigational/guidance systems.

Let us discuss how the Radio Grid method may be used to determine the location of Interrogator (1010). In one embodiment, Interrogator (1010) moves along Row A. We assume that the approximate location of Interrogator (1010) is known (e.g., on which Row or Column it is now traveling), but the specific location is not known. Interrogator 1 then comes in radio communication range of the Tag 1040 for which it is searching, transmits a CW tone to the Tag 1040, and receives a subcarrier signal from Tag 1040. Using that received signal, the angle $\theta$ from the direction of travel of Interrogator (1010) to the Tag 1040 may be determined, as disclosed above. The system now wishes to determine the specific location of Interrogator (1010). The system has, or has access to, a database of the locations of Grid Tags, such as Grid Tags 1050 and 1060. Nearby Grid Tags, such as 1050 and 1060, are addressed, and the angles between the direction of travel of Interrogator (1010) and the direction to Grid Tag 1050 and also to Grid Tag 1060 are determined. Given that the precise locations of the Grid Tags are known, the system can determine from triangulation the precise location of Interrogator (1010). Techniques such as those disclosed above should be employed to eliminate ambiguities in the measurement of the angles to the Grid Tags.

A variant of the above method is for the Interrogator to regularly determine its precise location, using the Grid Tag method, and update that location on a regular basis. Then, when the Tag 1040 comes into range, the location of Interrogator (1010) will be continually known.

Thus, assume we have taken at least two measurements of the angle $\theta$ from the direction of travel of the Interrogator to the Tag 1040; assume that the ambiguities in the measurement of these angles have been eliminated, and further assume that we have determined the specific location of Interrogator 1 (1010). These measurements are illustratively shown in FIG. 11. Using the calculations performed above for illustrative purposes, we have an angular resolution of 4°. The first measurement shows that at point $M_1$, the Tag 1170 was located at angle $\theta_1$. The second measurement shows that at point $M_2$, the Tag 1170 was located at angle $\theta_2$. Then, these measurements outline an Uncertainty Area 1130 where the Tag 1170 could be located. If, for illustrative purposes, the distance from both $M_1$ and $M_2$ to the Tag is 10 meters, then each side of the Uncertainty Area 1130 is 0.7 meters, and assuming the Uncertainty Area 1130 to be a square, the area of the Uncertainty Area 1130 is about 0.5 sq. meters. It should be noted that this analysis ignores the effects of the "z", or height, direction. In a situation where Tags are affixed to objects located at different heights, or stacked on top of each other, the Uncertainty Area (or Uncertainty Volume) will be greater.

Location Mode B

Figure 12:
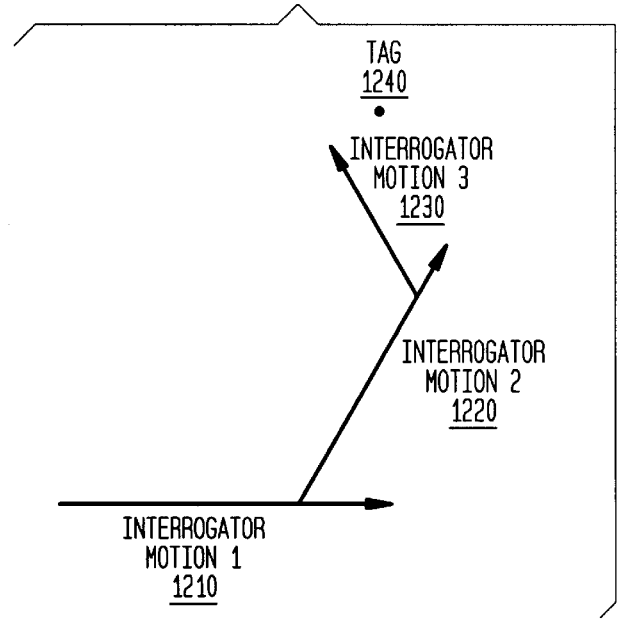
FIG. 12 shows how a specific Tag can be located using a search algorithm.

In Location Mode B, we use the direction finding capability of the system. In this method, a searcher moves in the direction of the Tag 1240 in an iterative, interactive fashion (see FIG. 12). This is particularly useful for the search and location of a particular Tag 1240 and the object to which this Tag is affixed. As the searcher approaches the Tag, the Tag directions (1210, 1220, 1230) will change more rapidly, and thereby directed the searcher to the final location by changing the direction of his or her travel to the latest Tag direction. As discussed above, ambiguities in the angle $\theta$ exist, and therefore several measurements will likely be required in order to eliminate those ambiguities. Similar techniques to those disclosed above can be used.

What has been described is merely illustrative of the application of the principles of the present invention. Other arrangements and methods can be implemented by those skilled in the art without departing from the spirit and scope of the present invention.

We claim:

1. A modulated backscatter location system, comprising:
   at least one transponder that receives a first transmitted signal and modulates a reflected first transmitted signal using a subcarrier signal; and
   at least one interrogator having a transmitter that transmits said first transmitted signal and a receiver that receives said reflected first transmitted signal, said interrogator having a demodulator that obtains a received subcarrier signal from said reflected first transmitted signal, and a processor that analyzes said received subcarrier signal to determine an angle of arrival of said reflected first transmitted signal.

2. The modulated backscatter location system of claim 1, comprising a plurality of interrogators that each determine an angle of arrival of a reflected signal and transmit said angle of arrival to another location.

3. The modulated backscatter location system of claim 2, wherein said another location is an interrogator.

4. The modulated backscatter location system of claim 2, wherein said another location is a server.

5. The modulated backscatter location system of claim 1, wherein said demodulator comprises a mixer that mixes said reflected first transmitted signal with another signal to obtain said received subcarrier signal.

6. The modulated backscatter location system of claim 1, wherein said demodulator is a homodyne demodulator.

7. The modulated backscatter location system of claim 1, wherein said processor determines a frequency difference between said received subcarrier signal and said subcarrier signal.

8. The modulated backscatter location system of claim 1, comprising a plurality of fixed transponders having a known location, each of said transponders responding to a received signal by modulating a reflected received signal using said subcarrier.

9. The modulated backscatter location system of claim 8, wherein said processor determines an angle of arrival of a reflected transmitted signal from each of said fixed transponders and determines a location of said interrogator using said angles of arrival.

10. The modulated backscatter location system of claim 1, wherein said angle of arrival is relative to a direction of travel of said interrogator.

11. A modulated backscatter location interrogator, comprising:

a transmitter that transmits a first transmitted signal;

a receiver that receives a reflected first transmitted signal;

a demodulator that obtains a received subcarrier signal from said reflected first transmitted signal; and a processor that analyzes said received subcarrier signal to determine an angle of arrival of said reflected first transmitted signal.

12. The modulated backscatter location interrogator of claim 11, wherein said processor communicates said angle of arrival to another location.

13. The modulated backscatter location interrogator of claim 11, wherein said demodulator comprises a mixer that mixes said reflected first transmitted signal with another signal to obtain said received subcarrier signal.

14. The modulated backscatter location interrogator of claim 11, wherein said demodulator is a homodyne demodulator.

15. The modulated backscatter location interrogator of claim 11, wherein said processor determines a frequency difference between said received subcarrier signal and a subcarrier signal.

16. The modulated backscatter location interrogator of claim 11, wherein said processor determines an angle of arrival for each of a plurality of reflected first transmitted signals and determines a location of said interrogator using said angles of arrival.

17. The modulated backscatter location interrogator of claim 11, wherein said angle of arrival is relative to a direction of travel of said interrogator.

* * * * *